(12) United States Patent
Cho et al.

(10) Patent No.: US 8,796,500 B2
(45) Date of Patent: Aug. 5, 2014

(54) METHOD OF DISPOSING OF RADIOACTIVE METAL WASTE USING MELTING DECONTAMINATION

(71) Applicant: Kepco Nuclear Fuel Co., Ltd., Daejeon (KR)

(72) Inventors: Suk Ju Cho, Daejeon (KR); Young Bae Lee, Daejeon (KR); Jeung Gun Seol, Daejeon (KR); Yong Jae Kim, Daejeon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 0 days.

(21) Appl. No.: 13/870,745

(22) Filed: Apr. 25, 2013

(65) Prior Publication Data

US 2013/0296628 A1    Nov. 7, 2013

(30) Foreign Application Priority Data

May 3, 2012    (KR) .................. 10-2012-0046976

(51) Int. Cl.
*A62D 1/00*    (2006.01)

(52) U.S. Cl.
USPC .................... 588/15; 588/412; 588/901

(58) Field of Classification Search
USPC ................... 588/15, 2, 10, 412, 252, 901
See application file for complete search history.

(56) References Cited

FOREIGN PATENT DOCUMENTS

| JP | 2003-075540 A | 3/2003 |
|---|---|---|
| KR | 10-0246733 B1 | 4/2000 |
| KR | 10-1016223 B1 | 2/2011 |

*Primary Examiner* — Edward Johnson
(74) *Attorney, Agent, or Firm* — Rabin & Berdo, P.C.

(57) ABSTRACT

Disclosed is a method of disposing of radioactive metal waste using melting decontamination, including sorting radioactive metal waste generated in nuclear fuel processing or production facilities by predetermined sorting criteria, and charging sorted metal waste into a melting furnace so as to be melted; adding a impurity remover to the melt of the melting furnace to remove generated slag; pouring the melt having no slag into a mold to form an ingot; subjecting the ingot to gamma spectroscopy using a gamma spectrometer to measure gamma rays of U-235 (185.72 keV, 57.2%) among uranium isotopes, performing detector calibration using a certified reference material and self-absorption correction depending on the density of a medium using MCNP computer code, and calculating total radioactivity of the ingot from the quantified radioactivity and mass of U-235; and efficiently and rapidly determining whether the ingot subjected to radioactivity measurement satisfies a clearance limit.

10 Claims, 12 Drawing Sheets

(a) CERTIFIED REFERENCE MATERIAL SPECTRUM (b) ENERGY CALIBRATION (LEFT)/EFFICIENCY CALIBRATION (RIGHT)

METHOD OF DISPOSING OF RADIOACTIVE METAL WASTE USING MELTING DECONTAMINATION

BACKGROUND OF THE INVENTION

1. Field of the Invention

The present invention relates to a method of disposing of radioactive metal waste using melting decontamination, and more particularly, to a method of disposing of metal waste, in which metal waste generated in nuclear fuel processing or production facilities is sorted by predetermined sorting criteria, followed by performing melting decontamination, subjecting the resulting ingots to gamma spectroscopy to measure radioactivity of only U-235 among uranium isotopes, calculating total radioactivity of the ingots, and efficiently and rapidly determining whether clearance of the ingots is possible.

2. Description of the Related Art

Industrial waste composed mainly of iron metals such as stainless steel and carbon steel is treated as a very important resource, and the rate of recycling thereof is considerably higher than other waste.

Typically, recycling of waste aims to resolve the dearth of natural resources and environmental problems such as air, water and soil contamination due to waste. However, in the case of metal waste, because the cost required to recycle resources or waste which has been re-treated is much smaller than the production cost of products using new natural resources, disposal of metal waste without recycling is regarded as a big loss in terms of environmental protection and economic benefits.

Also metal waste generated in nuclear facilities may be reproduced using a recycling process like other industrial metal waste. However, there is a potential for such metal waste to be radioactive because of artificial neutron irradiation or for the surface or volume thereof to have been contaminated by the radioactive materials used in nuclear facilities. Hence, when this waste is discharged to the market without appropriate restrictions, the public may be indiscriminately exposed depending on the recycling of contaminated metals. Accordingly, all metal waste generated in the radiation controlled zones of nuclear facilities is considered to be subject to restrictions in principle. However, if the same restriction rule is applied to the case where radiological effects on the public and the environment are considerably small because the concentration of radionuclides in metal waste is very small, the economic and social costs may be unnecessarily increased. In accordance with domestic nuclear-relevant act, only in the case where the concentration of radionuclides of metal waste is below a predetermined level (a disposal limit), namely where radiological effects on the public and the environment due to the recycling of metal waste are not more than a clearance limit defined by the nuclear-relevant act, is the waste deregulated so as to be disposed of (recycled). The related radiation safety management and radiological risk assessment are an absolute requirement of regulatory agencies, thus minimizing radiological effects on the public and the environment resulting from clearance.

Because metal waste such as filter frames, powder drums for natural uranium, nuts, bolts and metal scrap generated in nuclear fuel processing and production facilities are expected to be contaminated with uranium compounds such as UO2, UO2F2 or U3O8, these are regarded as radioactive waste and have to be regulated. However, the case where the concentration of the radioactive contaminant in the waste is not more than a clearance limit as mentioned above is deregulated, making it possible to carry out clearance via recycling.

Meanwhile, metal waste which is of the flat panel type and has a geometrical shape that is comparatively simple and which has a smooth surface or which has shapes similar thereto may be recycled using only surface decontamination. The real-time determination of radioactivity after a decontamination process is possible using both direct measurement using a surface contamination meter that operates in nuclear fuel processing plants and indirect measurement using smear. Thus, the surface contamination of metal waste having complicated geometrical shapes such as nuts or bolts cannot be subjected to direct measurement and smear measurement is also not easy, making it very difficult to decontaminate such metal waste and measure the radioactivity thereof.

In the case where metal waste having a complicated structure is heated to high temperature and melted, because the radioactive material in metal is uniformly distributed in the medium and the nuclear fuel material which is a contaminant of the melt moves into the slag, metal waste on which it is difficult to perform surface decontamination and direct measurement may be subjected to melting decontamination so that the volume thereof is reduced and uranium materials are removed from the metal medium, making it possible to carry out clearance.

Thorough research into melting decontamination techniques of metal waste containing radioactive materials is ongoing both within and outside the country. Particularly in the case where contaminants are nuclear fuel (uranium nuclides), most radioactive contaminants are reported to move into the slag upon melting. Although the decontamination effects thereof may ingot depending on initial contamination conditions and operating conditions including the melting additive used, the type of melting furnace, etc., the amount of uranium moving into the slag upon melting decontamination of the metal is at least 1000 times the amount of uranium that moves to ingots. This trend is reported to increase as the initial contamination becomes higher.

For example, Korean Patent No. 10-1016223 discloses a melting decontamination system of radioactive metal scrap, in which radioactive metal waste generated in nuclear facilities, containing U-238, Ce-144, Cs-134, Cs-137, Sr-89, Sr-90, Ni-63, Co-58, Co-60, Cr-51, etc. as nuclides to be decontaminated, are subjected to melting decontamination, so that decontaminated ingots are separated from radioactive slag, and the decontaminated ingots are recycled and the radioactive slag is treated as radioactive waste.

However to perform clearance of the ingots produced using melting decontamination, radioactivity of the ingots should be proven to be less than the disposal limit defined by nuclear-relevant act. To this end, measurement of the radioactivity of the ingots must be reliable.

Prior to melting decontamination, metals have surface contamination characteristics, whereas ingots produced using melting decontamination have volume contamination characteristics. Uranium nuclides which are radioactive contaminants are alpha emitters, so that alpha rays emitted upon the decay of uranium react with the medium and are mostly self-absorbed. Thus conventional radioactivity analysis methods using alpha nuclide surface contamination measurement may not be effective at analyzing the radioactivity of ingots.

Therefore the present invention is intended to provide a method of efficiently disposing of radioactive metal waste, in which the radioactivity of ingots produced using melting decontamination may be confirmed to be sufficiently uniform, and determination of whether clearance of ingots having volume contamination characteristics is possible based on such radioactivity results may be rapidly made.

SUMMARY OF THE INVENTION

Accordingly, the present invention has been made keeping in mind the above problems encountered in the related art, and an object of the present invention is to provide a method of disposing of radioactive metal waste using melting decontamination, which includes subjecting metal waste generated in nuclear fuel processing or production facilities to melting decontamination thus producing ingots, subjecting the ingots to gamma spectroscopy to measure the radioactivity of only U-235 among uranium isotopes, calculating the total radioactivity of the ingots, and rapidly and efficiently determining whether clearance of such ingots is possible.

In order to accomplish the above object, the present invention provides a method of disposing of radioactive metal waste using melting decontamination, comprising 1) sorting radioactive metal waste generated in nuclear fuel processing or production facilities by predetermined sorting criteria and charging the sorted metal waste into a melting furnace so that the metal waste is melted; 2) adding a impurity remover to a melt of the melting furnace and removing generated slag; 3) pouring the melt having no slag into at least one mold thus producing an ingot; 4) subjecting the ingot to gamma spectroscopy using a gamma spectrometer to measure gamma rays of U-235 (185.72 key, 57.2%) among uranium isotopes, performing detector calibration using a certified reference material (CRM) and self-absorption correction depending on the density of a medium using MCNP (Monte Carlo N-Particle) computer code, and calculating total radioactivity of the ingot from the quantified radioactivity and mass of U-235; and 5) determining whether the ingot subjected to radioactivity measurement satisfies a clearance limit.

Preferably in 1) of the prevent invention, pretreatment to decontaminate the surface of the metal waste is additionally carried out before charging the metal waste into the melting furnace.

Preferably in 3) of the prevent invention, a deoxidant is additionally added to the melt before pouring the melt into the mold.

Preferably in the prevent invention, the melting furnace is a high frequency induction heating furnace.

Preferably in the prevent invention, the melting furnace comprises a ladle for pouring the melt of the melting furnace to transfer the melt; a trolley positioned adjacent to the ladle so as to be transportable; and a plurality of molds positioned above the trolley to produce an ingot from the melt poured from the ladle.

Preferably in the prevent invention, U-235 has an enrichment of 0.711 w/o~5 w/o.

Preferably in 4) of the prevent invention, the radioactivity and mass of U-235 are quantified using a detection value of gamma rays of U-235, a total uranium weight is calculated depending on the enrichment of U-235, and radioactivity of total uranium is obtained from the following equation, and more preferably the enrichment of U-235 is determined depending on a source of the generated metal waste.

$$S.A(Ci/g)=(0.4+0.38E_{235}+0.0034E_{235}^2)\times 10^{-6}$$ [Equation]

In the above equation, S.A is a specific activity of total uranium using the enrichment ($E_{235}$) of U-235.

Preferably in the prevent invention, the gamma spectrometer is a NaI detector, and a measurement time of the ingot using the NaI detector is 3,600~7,200 sec.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, embodiments of the present invention will be described in detail with reference to the appended drawings.

Figure 1:
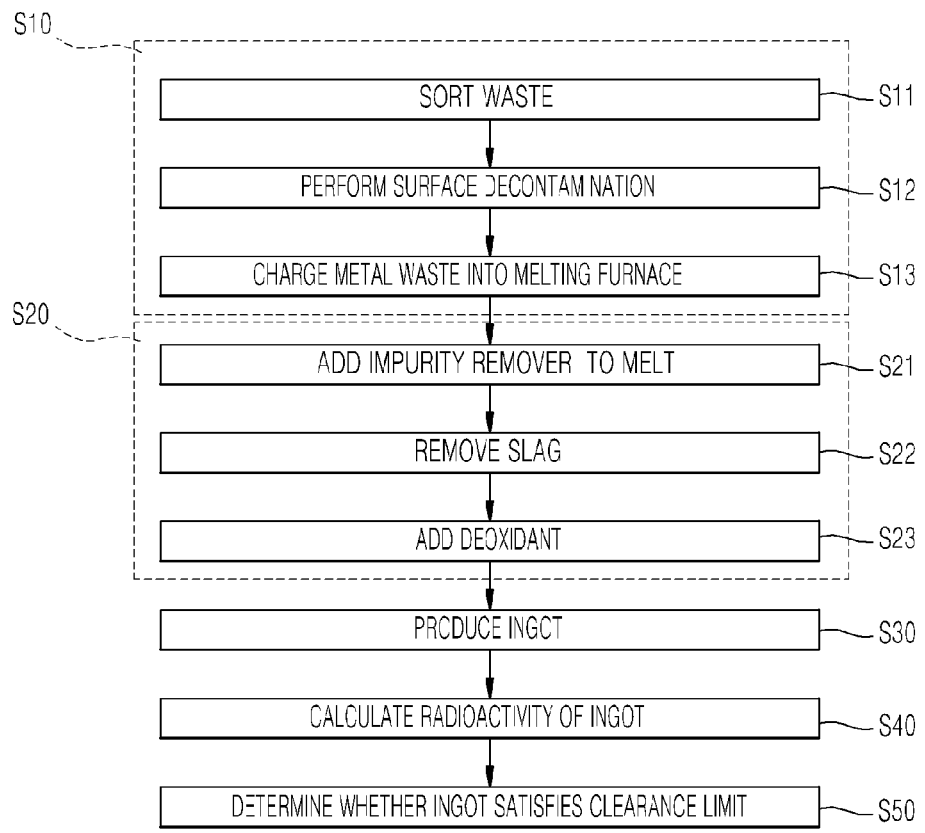
FIG. 1 is a flowchart illustrating the entire process of disposing of radioactive metal waste according to the present invention.

As illustrated in FIG. 1, a method of disposing of radioactive metal waste using melting decontamination according to the present invention includes sorting radioactive metal waste generated in nuclear fuel processing or production facilities by predetermined sorting criteria, and charging the sorted metal waste into a melting furnace so as to be melted (S10); adding a impurity remover to the melt of the melting furnace to remove generated slag (S20); pouring the melt having no slag into a mold to form an ingot (S30); subjecting the ingot to gamma spectroscopy using a gamma spectrometer to measure gamma rays of U-235 (185.72 keV, 57.2%) among uranium isotopes, performing detector calibration using a certified reference material (CRM) and self-absorption correction depending on the density of a medium using MCNP computer code, and calculating the total radioactivity of the ingot from the quantified radioactivity and mass of U-235 (S40); and determining whether or not the ingot subjected to radioactivity measurement satisfies a clearance limit (S50).

Specifically in step S10, radioactive metal waste is sorted by predetermined sorting criteria including a geometrical shape, enrichment of nuclear fuel (for a light water reactor or heavy water reactor) as a contaminant, etc. (S11) and the sorted metal waste is charged into the melting furnace and melted (S13).

In particular the metal waste of the invention is referred to as that generated in nuclear fuel processing or production facilities, and the surface of such metal waste may be contaminated with a very small amount of nuclear fuel material due to dust or the like generated during the processing of nuclear fuel. Thus, the nuclear fuel material generated in nuclear fuel processing or production facilities is provided in the chemical form of $UO_2$, $U_3O_8$, etc., having an enrichment from 0.711 w/o (natural uranium) to 5 w/o, and exists in a particulate phase.

Concretely, radiation sources included in uranium ores used upon production of nuclear fuel may include not only uranium isotopes for example, U-238, U-235, U-234 and the like, but also daughter nuclides, fission products, transuranic radionuclides, etc. resulting from decay of the uranium isotopes. However, radionuclides other than the uranium isotopes are removed via a series of uranium refining, transformation and re-transformation to manufacture nuclear fuel. Also, the daughter nuclides of uranium resulting from radioactive decay to create a nuclear fuel assembly exist in a very small amount which is difficult to analyze, taking into consideration the nuclear fuel processing time and the like, and furthermore the metal waste is refined again via melting decontamination and thus the contaminants of the ingots produced from the metal waste may also be limited to uranium isotopes, such as U-234, U-235 and U-238, and daughter nuclides such as Th-234 and the like which achieve radioactive equilibrium within a short time.

Also, unlike nuclear power plants, in nuclear fuel processing facilities, the probability of radioactive metals being formed due to neutron irradiation is very low, and thus there is no potential for radioactive metal waste to be created.

The metal waste generated in such nuclear fuel processing facilities may include drums such as powder drums for natural uranium, filter frames, ducts, pump blades, bolts, nuts, etc. Among these, powder for natural uranium, filter frames and the like having comparatively simple geometrical shapes are easily subjected to surface decontamination and radioactivity measurement and thus the decontamination thereof may be carried out using chemical cleaning, high pressure water spray, etc.

On the other hand, metal waste having complicated geometrical shapes is subjected to melting decontamination. Before melting decontamination, the metal waste is sorted according to the material and kind based on the enrichment of nuclear fuel (for light water reactors or natural uranium) as a contaminant, and then charged into the melting furnace. Particularly in the present invention, metal waste which will be subjected to melting decontamination includes that generated in nuclear fuel processing or production facilities, in which the enrichment of U-235 falls in the range of 0.711 w/o (natural uranium)~5 w/o.

Before charging the metal waste into the melting furnace (S13) to perform surface decontamination, melting pretreatment is carried out (S12), and specifically chemical or physical decontamination such as high pressure water spray on the metal surface, surface cleaning, etc., depending on the level of radioactivity, are performed, thus removing items attached to the surface and paint.

In step S20, a impurity remover is added to the melt of the melting furnace (S21) and the generated slag is removed (S22).

The melting furnace of the invention is a high frequency induction heating furnace. The inductive melting furnace is a type that forms a circuit on a target metal by induction current generated while electricity flows around the target metal to heat the metal, and the melt is stirred in the melting furnace, advantageously ensuring uniformity of the ingot produced using melting, which facilitates measurement of the radioactivity of the ingot. This furnace enables the melting process to be easily carried out and reduces metal loss, compared to other melting furnaces.

Figure 2:
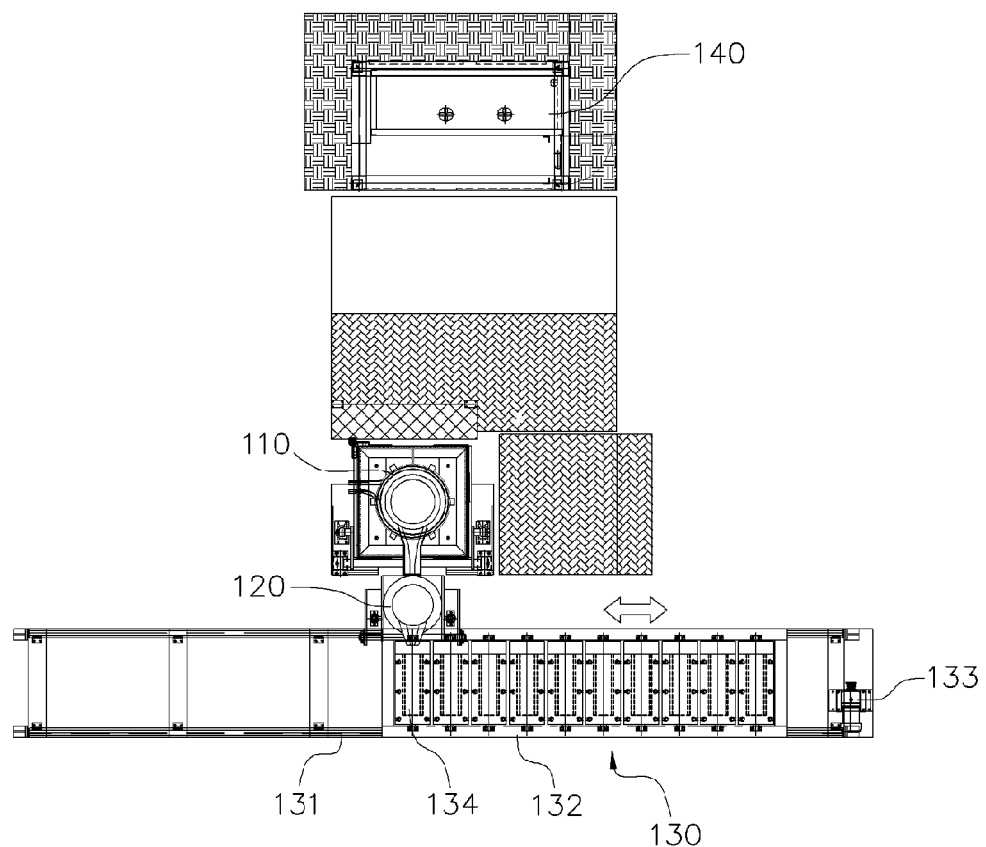
FIGS. 2 and 3 are a top plan view and a side view illustrating a melting decontamination apparatus according to a preferred embodiment of the present invention.

With reference to FIG. 2, a melting decontamination apparatus according to the present invention includes a melting furnace 110 for heating and melting metal waste using induced current, a ladle 120 for injecting the melt having no slag into the mold from the melting furnace 110, and a mold unit 130 for producing an ingot from the melt of the ladle 120.

An induction coil is provided around the melting furnace 110 to induce current flows, and a high-frequency output unit 140 is provided to supply high frequency current to the induction coil.

The ladle 120 is used to inject the melt having no slag into the mold from the melting furnace 110. When the ladle 120 is tilted, the melt is injected into the mold to produce the ingot.

The mold unit 130 includes a trolley 132 transportable along a rail 131, a motor 133 for driving the trolley 132, and a plurality of molds 134 provided above the trolley 132.

The trolley 132 and the motor 133 are connected to each other by a chain, so that the trolley 132 may be transported along the rail 131 via forward or backward operation of the motor 133.

The plurality of molds 132 is positioned above the trolley 132. Respective molds 132 may be provided so as to be overturned above the trolley 132, and the melt injected into the molds 132 is cooled thus forming solid ingots, after which the molds 132 are overturned to separate the ingots from the molds 132.

Although not shown, the melting decontamination apparatus may be provided with a known dust collection unit for collecting gas or dust generated during the melting procedure.

Figure 3:
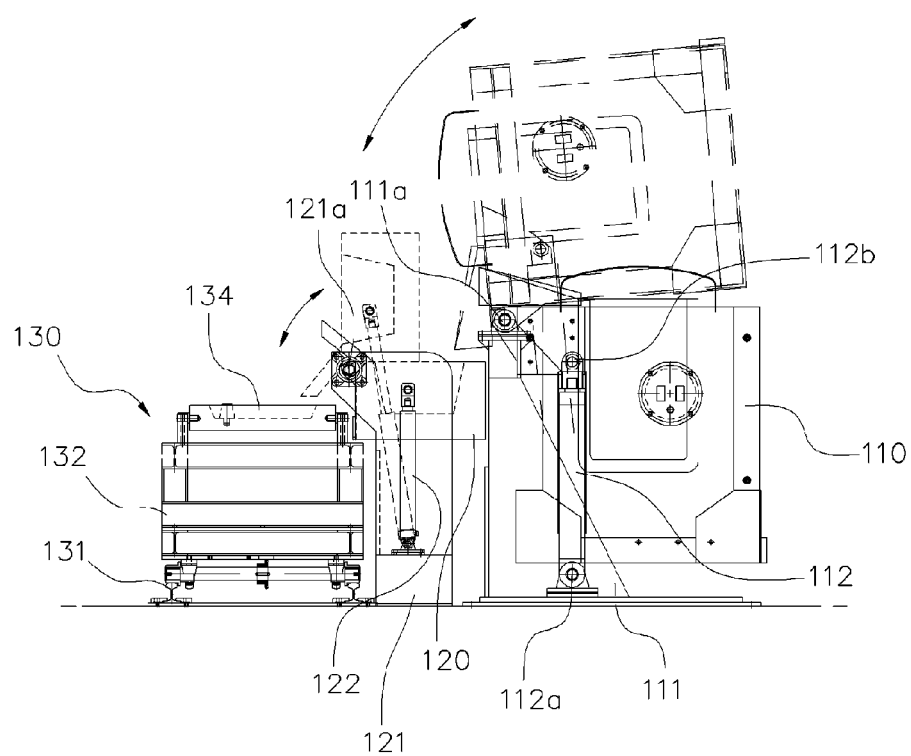

FIG. 3 illustrates the side view of the main units of the melting decontamination apparatus according to the present invention, in which the melting furnace 110 is mounted on a first stationary base 111 firmly fixed to a bottom so that the upper end thereof is rotatably supported on a first rotary shaft 111a, and the lower end of a cylinder 112 is rotatably connected to the bottom by a second rotary shaft 112a and the upper end of the cylinder 112 is rotatably connected to the melting furnace 110 by a third rotary shaft 112b.

The cylinder 112 is reciprocated in a longitudinal direction using hydraulic or pneumatic pressure, and the melting furnace 110 may be rotated around the first rotary shaft 111a depending on the degree of extension of the cylinder 112, whereby the melt may be transferred into the ladle 120 from the melting furnace 110.

The ladle 120 provided adjacent to the melting furnace 110 is mounted on a second stationary base 121 firmly fixed to the bottom so that the upper end thereof is rotatably supported on a fourth rotary shaft 121a, and a second cylinder 122 is provided to the ladle 120, like the cylinder 112 provided to the melting furnace 110, so that the ladle 120 is rotated around the fourth rotary shaft 121a using extension of the second cylinder 122, thus transferring the melt into the mold 134 from the ladle 120.

The melting decontamination process using the melting decontamination apparatus configured as above is performed by adding a single melting additive or a plurality of melting additives to the melt of the melting furnace depending on the properties of metals of the melt of the melting furnace and the extent of impurities (S21), in which the melting additive, for example, the impurity remover (main component: $SiO_2$) for removing impurities from the melt is periodically added in a predetermined amount, thereby removing slag from the melt. The impurity remover may be periodically added until no more slag is generated in the melt.

To ensure the fluidity of the melt when initially melted, a carbon additive may be added together with ones of kg of a recarburizer.

After complete removal of the impurities from the melt, step S30 for producing ingots is carried out. As such, an appropriate amount of deoxidant ($Al_2O_3$) may be added to prevent foaming due to oxidation upon casting ingots (S23).

In step S30, the melt having no slag is poured into the molds, thus producing ingots.

After completion of the melting decontamination via step S20, the melt of the melting furnace 110 is poured into the molds provided under the melting furnace thus producing ingots. The ingots have a width of about 20 cm, a length of about 40 cm, and a height of 4 cm with a weight of about 25 kg, although these ingot depending on the amount of melt poured into the mold.

With reference to FIGS. 2 and 3, after completion of the melting decontamination, the melt of the melting furnace 110 is transferred into the ladle 120, and the melt transferred into the ladle 120 is injected into respective molds 134 of the mold unit 130 and then cooled for a predetermined period of time, thus producing ingots.

In step S40, the produced ingots are subjected to gamma spectroscopy using a gamma spectrometer to measure gamma rays of U-235 (185.72 key, 57.2%) among uranium isotopes, and the total radioactivity of the ingots is calculated.

As mentioned above, the metal waste which is to be subjected to melting decontamination in the present invention was generated in nuclear fuel processing or production facilities. The radiation sources included in uranium ores used in the nuclear fuel processing or production facilities may include uranium isotopes, for example, U-238, U-235, U-234 and so on, and daughter nuclides, fission products, transuranic radionuclides and the like resulting from the decay of the uranium isotopes. However, other radionuclides besides uranium isotopes are removed via a series of uranium refining, transformation and re-transformation to manufacture nuclear fuel, and the daughter nuclides of uranium formed by radioactive decay to create a nuclear fuel assembly are present in a very small amount to the extent that analysis is almost impossible, taking into consideration the processing period of nuclear fuel, etc. Because the metal waste is refined again via melting decontamination, contaminants in the ingots produced from the metal waste may be limited to uranium isotopes such as U-238, U-235 and U-234 and their daughter nuclides which achieve radioactive equilibrium within a short time, such as Th-234 and the like. In the nuclear fuel processing facilities, the probability of radioactive metals being formed due to neutron irradiation is very low unlike nuclear power plants, and thus there is no potential for the metal waste itself to be radioactive.

The main radiation sources emitted from the ingots may be limited to U-238, U-235, and U-234. Particularly in the present invention, gamma rays of U-235(185.72 keV, 57.2%) among uranium isotopes are measured using gamma spectroscopy by means of a gamma spectrometer, and detector calibration using CRM and self-absorption correction depending on the density of the medium using MCNP computer code are performed, and the total radioactivity of the ingots is calculated from the quantified radioactivity and mass of U-235.

Detecting the radioactivity of total uranium including U-234 and U-238 isotopes using only U-235 as a direct measurement value via gamma spectroscopy will be described later.

In step S50, whether the ingots the measurement of radioactivity of which was completed satisfy a clearance limit is determined. If the radioactivity of the target ingots does not exceed the clearance limit, the ingots may be recycled using clearance. In contrast, if the radioactivity thereof is not less than the clearance limit, the corresponding ingots may be fed again into the melting furnace so that melting decontamination is carried out.

Below is a description of detecting the radioactivity of total uranium including U-234 and U-238 isotopes using only U-235 as a direct measurement value determined using gamma spectroscopy in step S40 of the method of disposing of the radioactive metal waste using melting decontamination according to the present invention.

Figure 4:
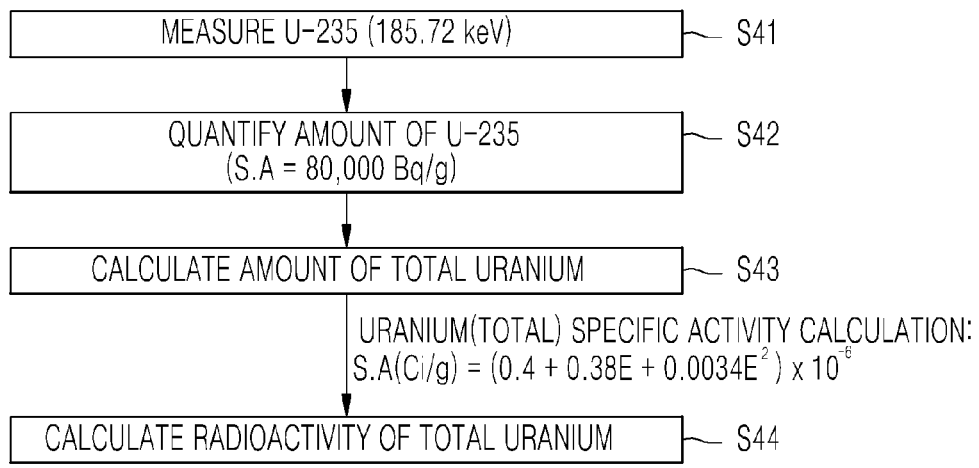
FIG. 4 is a flowchart schematically illustrating the procedure of determining the radioactivity of total uranium of ingots using gamma spectroscopy, in the process of disposing of radioactive metal waste according to the present invention.

With reference to FIG. 4, step S40 includes subjecting the ingots to gamma spectroscopy using a gamma spectrometer to measure gamma rays of U-235 (185.72 key, 57.2%) among uranium isotopes (S41), performing detector calibration with respect to the measurement value and self-absorption correction depending on the density of the medium using MCNP computer code to quantify the radioactivity and mass of U-235 (S42), calculating the total uranium weight depending on the enrichment of U-235 (S43), and substituting the corresponding values into the following Equation 1 to obtain the radioactivity of total uranium (S44).

$$S.A(Ci/g) = (0.4 + 0.38 E_{235} + 0.0034 E_{235}^2) \times 10^{-6} \qquad \text{[Equation 1]}$$

In Equation 1, S.A is a specific activity of total uranium using the enrichment ($E_{235}$) of U-235.

In the present invention, radioactivity analysis using gamma spectroscopy is advantageous because there is no need for complicated pretreatment and analysis may be conducted at comparatively lower cost. Furthermore, a variety of radiation detectors may be utilized upon gamma analysis, and for precise analysis, a high purity germanium (HPGe) detector having superior energy resolution may be used, and a portable HPGe or NaI detector is preferably utilized.

Particularly useful in the present invention is a NaI detector, in which the ingots may be rapidly measured in the temporal range of 3,600~7,200 sec. Accordingly, whether clearance of the ingots subjected to melting decontamination is possible may be rapidly and efficiently determined.

All of uranium isotopes U-234, U-235 and U-238 emit gamma rays via alpha decay. U-235 emits gamma rays of 185.72 key at high rate (57.2%) and thus gamma rays may be directly measured and the radioactivity may be calculated, whereas it is not easy to directly determine U-234 and U-238. For example, directly determining U-234 and U-238 may be carried out using secular equilibrium with uranium's daughter nuclides in nature, but is problematic because a considerably long period of time is required to achieve secular equilibrium. Particularly metal waste generated in nuclear fuel processing or production facilities includes enriched uranium which is present in a state in which uranium and its daughter nuclides have unbalanced concentrations, making it impossible to calculate radioactivity of U-234 or U-238 via measurement of gamma rays of daughter nuclides.

On the other hand, U-235 emits gamma rays of 185.7 key at a high rate of 57.2% upon decay, making it possible to directly measure U-235. Gamma rays emitted from U-235 measured in this range are interfered with by gamma rays of 186.2 key (3.59%) emitted from Ra-226 in nature.

$$C(186) = C(^{235}U, 185.7) + C(^{226}Ra, 186.21)$$

Specifically, in order to calculate the radioactivity of U-235 based on the count rate measured in the energy range of 185-186 key, the count rate measured by decay of Ra-226 in the same energy range should be corrected. Because Ra-226 which exists in nature is in a state of secular equilibrium with its daughter nuclides Pb-214 and Bi-214, the gamma rays of Pb-214 and Bi-214 may be measured to calculate the count rate of gamma rays emitted by decay of Ra-226. In the case where a daughter nuclide of Ra-226, that is, Rn-222 which is present in a gas phase, is allowed to stand open to the air, it may diffuse in air. Hence, Rn-222 must be stored sealed for a period of time (about one month) sufficiently longer than its half life of 3.82 days so as to prevent it from being emitted into the air.

The relationship between the count rate of gamma rays of 295.2 key emitted from Pb-214 and the count rate of gamma rays of 186.21 key emitted from Ra-226 is represented by the following Equation 2.

$$C(^{226}Ra, 186.21) = \frac{\varepsilon(186.21) \times I(^{226}Ra, 186.21)}{\varepsilon(295.2) \times I(^{214}Pb, 295.2)} \times C(^{214}Pb, 295.2)$$ [Equation 2]

Pb-214 also emits gamma rays of 351.9 key, and cross validation may be conducted using the same. The count number of gamma rays emitted from Pb-214 may be interfered with by gamma rays of 351.06 key emitted from Bi-214. Although the count number of gamma rays of 351.9 keV emitted from Pb-214 may be interfered with by gamma rays of 351.06 key emitted from Bi-214, Bi-214 and Pb-214 are in secular equilibrium as mentioned above, thereby making it possible to determine the radioactivity of each nuclide.

$$C(^{226}Ra, 186.21) = \frac{\varepsilon(186.21) \times I(^{226}Ra, 186.21)}{\varepsilon(351.9) \times I(^{214}Pb, 351.9)} \times \frac{C(351)}{1 + \frac{\varepsilon(351.06) \times I(^{214}Bi, 351.06)}{\varepsilon(351.9) \times I(^{214}Pb, 351.9)}}$$

Typically because Ra-226 and U-238 have the same radioactivity in nature in which a mother nuclide and a daughter nuclide are in secular equilibrium, it is possible to calculate effects of gamma rays of 186.21 key of Ra-226 with the radioactivity of U-238 in nature. In the case of a natural sample containing naturally enriched uranium, 57.6% of the area of the peak of the energy range of 185~187 key is caused by Ra-226. Thus the case where the sample containing natural radioactive nuclides such as concrete is contaminated by a nuclear fuel material needs correction to calculate uranium radioactivity.

However, in the case of metal waste, because the medium itself does not contain nuclides present in nature, Ra-226 or the like creates no interference. When the sample is contaminated with artificially enriched nuclear fuel, the count number of gamma rays of U-235 may be overestimated because of the gamma rays of Ra-226 formed by decay from U-238. However, millions of years are required until the amount of gamma rays emitted from Ra-226 produced from artificially contaminated U-238 has an influence on the quantification of U-235, and thus for metal waste like that generated in nuclear fuel processing or production facilities as in the present invention, the effects of Ra-226 resulting from artificial uranium contamination may be ignored.

As mentioned above, the nuclear fuel material handled in nuclear fuel processing or production facilities includes only uranium isotopes, in which the uranium enrichment falls in the range of 0.711 w/o (natural uranium)~5.0 w/o. Because the nuclear fuel used is processed differently depending on its enrichment in a manner similar to that used to process fuel for a heavy water reactor, which is manufactured separately from fuel for a light water reactor, it is possible to determine the enrichment of the nuclear fuel contaminant depending on the sources of generated metal waste and also to estimate the activity ratio and the abundance ratio of U-238 and U-234 by quantification of only U-235, as given in Table 1 below.

TABLE 1

Abundance Ratio and Activity Ratio of Uranium Isotopes depending on Enrichment of U-235

| Nuclide | Nature | | 2.0 w/o | | 3.5 w/o | | 4.5 w/o | |
|---|---|---|---|---|---|---|---|---|
| | Abundance Ratio | Activity Ratio | Abundance Ratio | Activity Ratio | Abundance Ratio | Activity Ratio | Abundance Ratio | Activity Ratio |
| U-234 | 0.00005 | 0.48700 | 0.00016 | 0.73500 | 0.00030 | 0.82300 | 0.00039 | 0.85625 |
| U-235 | 0.00711 | 0.02300 | 0.02000 | 0.03043 | 0.03500 | 0.03400 | 0.04500 | 0.03319 |
| U-238 | 0.99284 | 0.49000 | 0.97984 | 0.23400 | 0.96470 | 0.14400 | 0.95461 | 0.11055 |

Figure 5:
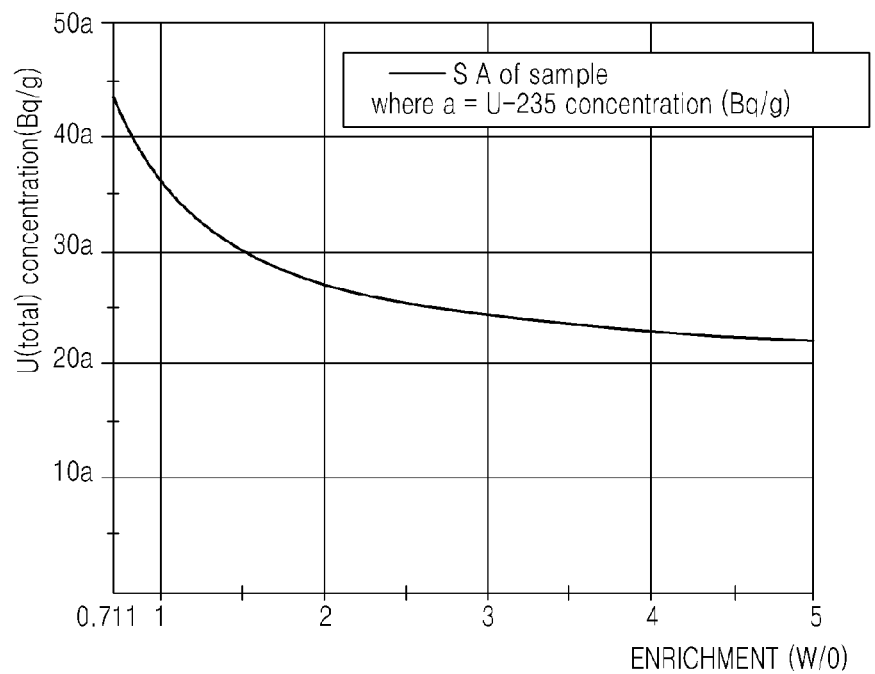
FIG. 5 is a graph illustrating the uranium radioactivity depending on the enrichment.

Specifically, the radioactivity and mass of U-235 may be quantified from the detection value of U-235 (185.72 keV, 57.2%), and the total uranium weight may be calculated using the abundance ratio of Table 1 from the enrichment of U-235, and also the radioactivity of total uranium may be obtained from Equation 1 (For reference, FIG. 5 is a graph illustrating the specific activity of uranium depending on the enrichment of U-235).

$$S.A(Ci/g) = (0.4 + 0.38E_{235} + 0.0034E_{235}^2) \times 10^{-6}$$ [Equation 1]

In Equation 1, S.A is the specific activity of total uranium using the enrichment ($E_{235}$) of U-235.

For example, when U-235 is measured to be 1 Bq, the specific activity of U-235 is $8.00 \times 10^4$ Bq/g, and the corresponding weight is $1.25 \times 10^{-5}$ g. When the enrichment is 2.0 w/o, the total uranium weight may be determined to be $6.254 \times 10^{-4}$ g as seen in Table 1, and thus the total radioactivity may be calculated to be 27.14 Bq from the specific activity of total uranium obtained using the enrichment (2 w/o) of U-235 in Equation 1.

Table 2 below shows the radioactivity of uranium depending on the enrichment of representative U-235.

TABLE 2

Uranium Radioactivity depending on Enrichment

| Enrichment (w/o) | 0.711 | 2 | 3.5 | 5 |
|---|---|---|---|---|
| Radioactivity (Bq) of Measured U-235 | 1 | 1 | 1 | 1 |
| U-total estimated amount (g) | $1.763 \times 10^{-3}$ | $6.254 \times 10^{-4}$ | $3.574 \times 10^{-4}$ | $2.504 \times 10^{-4}$ |
| U-total radioactivity (Bq) | 43.70 | 27.14 | 23.41 | 22.06 |

When the radioactivity of U-235 is determined in this way, the estimated amount of U-238 increases in proportion to the decrease in the enrichment of uranium, thus increasing the total amount of uranium, resulting in higher total radioactivity.

The concentration of U-235 is quantified via gamma nuclide analysis, after which the enrichment which deduces the most conservative result is applied thus estimating the radioactivity of total uranium.

However, in the case where metal waste generated in the course of manufacturing nuclear fuel for a light water reactor using 4.5 w/o uranium is handled like the metal waste generated during the manufacture of nuclear fuel for a heavy water reactor, the radioactivity obtained as above may be overestimated to the extent of about two times compared to the former. For accurate analysis, metal waste has to be sorted depending on the generation source and then separately analyzed. Metal waste having an unclear generation source may be subjected to radioactivity assay using natural enrichment from which the most conservative result is deduced. Actually, because the light water reactor process and the heavy water reactor process are separately performed, 2 w/o may be applied to conduct an assay in the case of the light water reactor.

—Self-Absorption Correction—

In the present invention, the certified reference material ($H_2O$: $\rho=1.0$ g/cm$^3$) and the sample (ingot (chipped): $\rho=0.1$~7.8 g/cm$^3$) to undergo gamma nuclide analysis depending on the density of a medium are simulated using MCNP (Monte Carlo N-Particle) computer code, and probabilities of the gamma rays generated upon decay of U-235 in the medium reaching the detector are respectively calculated, thus attaining an absorption correction factor for the ingot samples.

Figure 6:
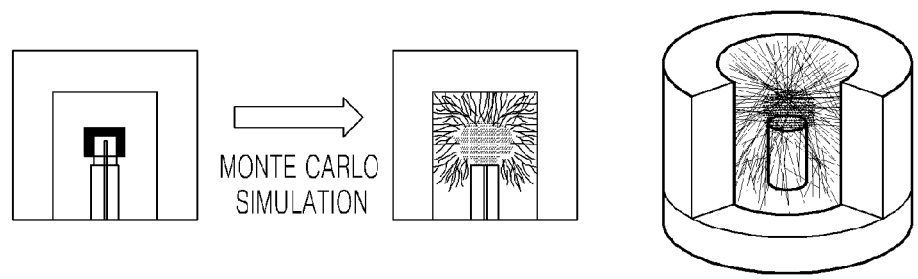
FIG. 6 diagrammatically illustrates results of calculating a self-absorption correction value upon gamma nuclide analysis using MCNP computer code.

FIG. 6 diagrammatically illustrates the results of calculating the self-absorption correction value depending on the geometry and density of each medium when the energy of gamma rays is 185.72 keV as in the emitted gamma rays upon decay of U-235 using MCNP computer code.

The self-absorption correction coefficient (K) is represented by Equation 3 below.

$$K_{ies} = \frac{M_{ies}}{CRM_{es}} \quad \text{[Equation 3]}$$

In Equation 3, K is the self-absorption correction coefficient, CRM is the count number of the certified reference material simulated with MCNP, M is the count number of the ingot medium source simulated with MCNP, e is the energy of gamma rays (in this case, 185.72 keV), i is the density of the medium (g/cm$^3$), and s is the form of the certified reference material and the medium.

Figure 7:
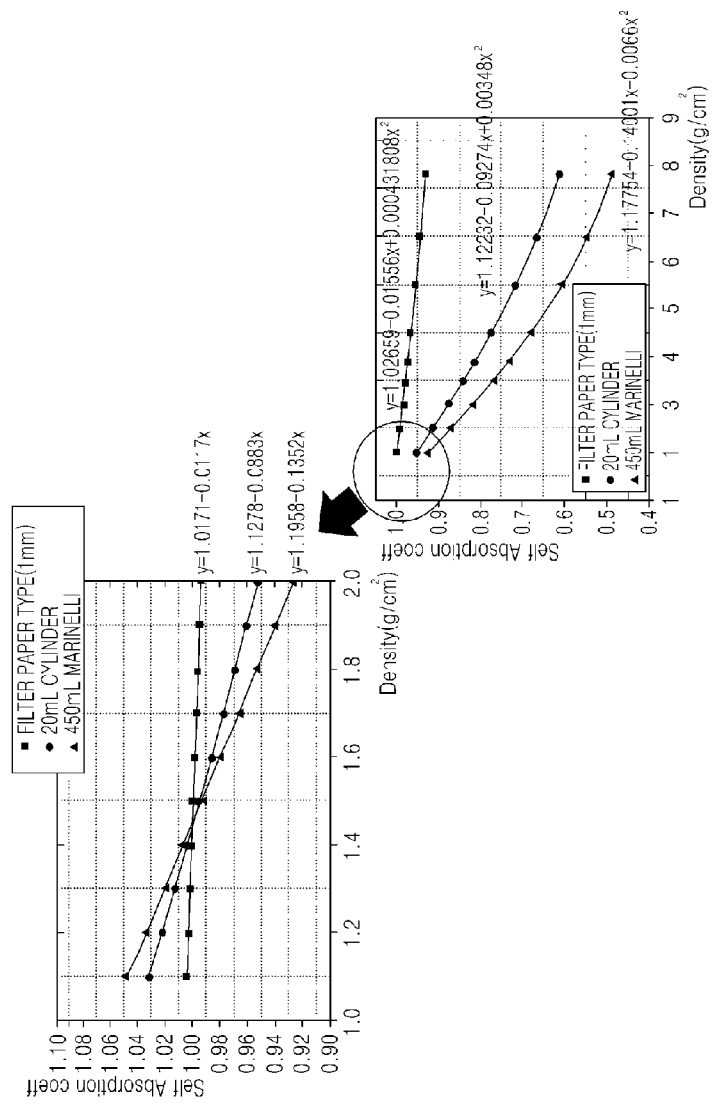
FIG. 7 is of graphs illustrating the self-absorption correction value upon gamma nuclide analysis using MCNP computer code according to the present invention.

As seen in FIG. 7, the correlation between the self-absorption correction coefficient and the density in the low density range of the medium (1.0~2.0 g/cm$^3$) is different from the correlation between the self-absorption correction coefficient and the density in the high density range (2.0 g/cm$^3$ or more). As such, examples of the source medium include 450 mL Marinelli beaker type (▲), 20 mL cylinder type (●), and 1 mm thick filter paper type (■).

In the low density range, the correlation between the self-absorption correction coefficient and the density is seen to be comparatively linear as in conventional studies, but over the entire density range, the self-absorption correction coefficient decreases exponentially in proportion to the increase in density. This is based on the physical trend according to which as the atomic density in the medium increases, the probability of gamma rays passing through the medium not interacting with the medium decreases exponentially.

Thus in the case where the medium is iron-based metal composed mainly of Fe, the self-absorption coefficient correlation calculated using the MCNP computer code depending on the form and density of each medium is given in Table 3 below.

TABLE 3

Self-Absorption Correction Coefficient Correlation depending on Sample Form and Density Range

| Sample | Density (g/cm$^3$) | Self-Absorption Correction Efficient Correlation ($\rho$ = medium density (g/cm$^3$)) | Note |
|---|---|---|---|
| 450 mL Marinelli | <2.0 | y = 1.1958 − 0.1352$\rho$ | |
| | ≥2.0 | y = 1.17754 − 0.14001$\rho$ + 0.0066$\rho^2$ | |
| 20 mL Cylinder | <2.0 | y = 1.1278 − 0.0883$\rho$ | |
| | ≥2.0 | y = 1.12232 − 0.09274$\rho$ + 0.00348$\rho^2$ | |
| 1 mm Filter Paper | <2.0 | y = 1.0171 − 0.0117$\rho$ | |
| | ≥2.0 | y = 1.02659 − 0.01556$\rho$ + 0.000431808$\rho^2$ | |

Slag produced via melting decontamination is mostly a silicon/carbon-based material and becomes brittle and shatters even when receiving a small physical impact, and may be easily measured in an analytic sample vessel such as a Marinelli beaker in order to perform gamma nuclide analysis. However, ingots are manufactured by pouring a hot melt into molds and then performing rapid cooling, and the resulting solidified ingots are difficult to shape due to the strength properties thereof, making it difficult to form them into the same shape as the analytic sample vessel.

Hence, the surface and inside of the ingot are subjected to milling and drilling to obtain chips, after which the chips are ground thus manufacturing a sample, which is regarded as effective. In accordance with the simulation results using the MCNP computer code, in the low density range of about 1.4 g/cm$^3$ or less upon measurement simulation of the ingot, the number (count number) of gamma rays which change into a pulse in the detector can be seen to increase, compared to the measurement simulation using the certified reference material (CRM). This means that the self-absorption correction coefficient (K) is 1.0 or more in the corresponding density range.

TABLE 4

Linear Absorption Coefficient depending on Density and Medium

| | Linear Absorption Coefficient (cm$^{-1}$) per medium | | |
|---|---|---|---|
| Density | $H_2O$ (CRM) | Ingot | Note |
| 1.0 g/cm$^3$ | 0.14031 | 0.15700 | Gamma Energy = 186 keV |
| 1.1 g/cm$^3$ | — | 0.17270 | |
| 1.2 g/cm$^3$ | — | 0.18840 | |
| 1.3 g/cm$^3$ | — | 0.20410 | |
| 1.4 g/cm$^3$ | — | 0.21980 | |

As is apparent from Table 4 showing the linear absorption coefficient depending on the medium in the low density range, the corresponding values are calculated so as to be adapted to the density based on mass absorption coefficient library per nuclide as represented in "Radiological Health Handbook (1970)".

The certified reference material (CRM) is composed mainly of $H_2O$ and has a smaller linear absorption coefficient compared to the ingot as shown in Table 4, and thus, effects caused upon passing gamma rays through the medium are lower compared to the ingot.

Taking into consideration only such effects, the case where the medium is the ingot should satisfy conditions in which the number of gamma rays which reach the detector is lower and K (which is the self-absorption correction coefficient) is thus 1.0 or less, compared to the case where the medium is $H_2O$. However, because gamma rays may scatter while passing through the material, gamma rays emitted outside the solid angle in the measurement direction from the ray source may react with the medium and may scatter and come into the detector to thus be measured. In particular because the elastic scattering cross section varies with respect to gamma rays depending on the composition of each medium, such effects become different depending on the composition of the medium. Moreover, the elastic scattering cross section of the ingot in the energy range of 186 keV is much larger than that of $H_2O$, and thus, gamma rays emitted in the direction opposite the detector in the vicinity of the medium close to the detector are more greatly affected by back scattering. In the low density range in which the linear absorption coefficient is comparatively low, the case where the medium is the ingot increases the count number compared to the case where the medium is $H_2O$.

Figure 8:
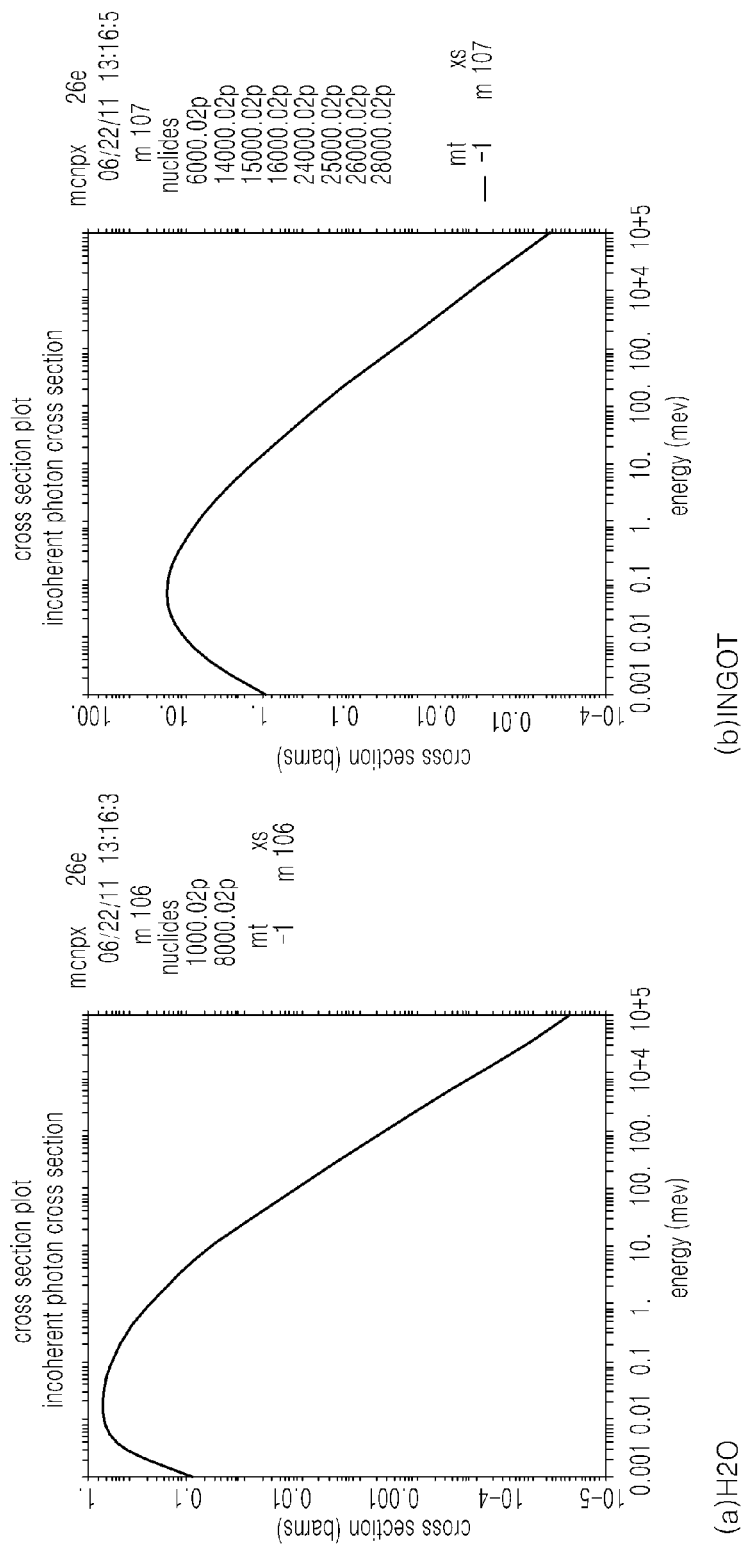
FIGS. 8A and 8B are graphs illustrating an incoherent photon elastic scattering cross section of $H_2O$ and an ingot respectively in an energy range according to the present invention.
Figure 9:
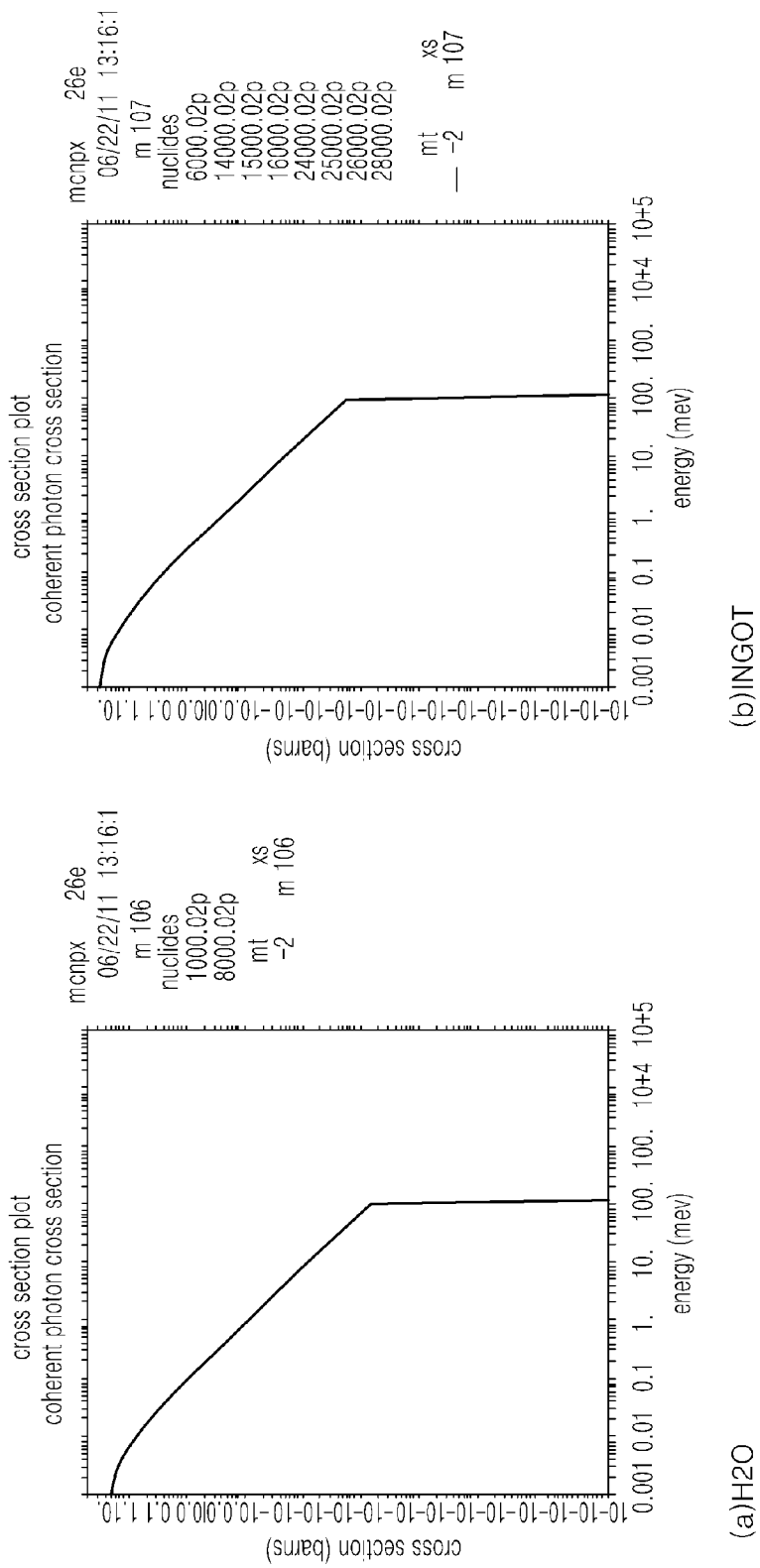
FIGS. 9A and 9B are graphs illustrating a coherent photon elastic scattering cross section of $H_2O$ and an ingot respectively in an energy range according to the present invention.

FIGS. 8A and 8B and 9A and 9B are graphs illustrating incoherent/coherent photon elastic scattering cross sections of $H_2O$ of FIGS. 8A and 9A and of the ingot of FIGS. 8B and 9B in an energy range, in which the elastic cross section near 186 key is at least 10 times more when the medium is the ingot compared to when the medium is $H_2O$, which means that the probability for the gamma rays emitted in the direction opposite the detector to be back scattered via a reaction with the medium and thus be measured higher by the detector when the medium is the ingot. Accordingly, in the case of a low density medium, detection efficiency may be higher when the medium is the ingot compared to when the medium is $H_2O$.

This phenomenon mainly occurs only near the surface of the sample that almost contacts the detector, and thus is decreased in the case of a high density sample in which attenuation of gamma rays play a leading role in interaction of gamma rays with the material.

Example

A gamma spectrometer used in an example of the invention is identiFINDER available from Thermo provided with a multichannel analyzer, NaI (1.4 in×2 in), a GM tube, and a neutron monitor ($^3$He tube), making it possible to perform analysis of gamma nuclides and discrimination of the nuclides and to measure spatial dose. This detector is provided with 3 nCi Cs-137, so that energy calibration is possible without an additional calibration source, a maximum of 100 spectrums obtained using detection may be stored and the collected spectrums may be downloaded via connection with the PC to enable analysis on the PC.

Typically, minimum detection activity (MDA) of the detector is in inverse proportion to the effective live time and is proportional to the square root of the background count. To ensure sufficient MDA upon measurement, effects of background radiation should be minimized, and the detection time of a predetermined period of time or longer should be ensured.

A background count rate is maintained at a predetermined level so long as additional shielding is not carried out. Thus, as the detection time increases, MDA decreases in proportion to the square root of the detection time. Even when the detection time is increased under the condition of a predetermined level being exceeded, MDA is not greatly decreased, and thus it is important to minimize the effects of background radiation using shielding or the like.

Figure 10:
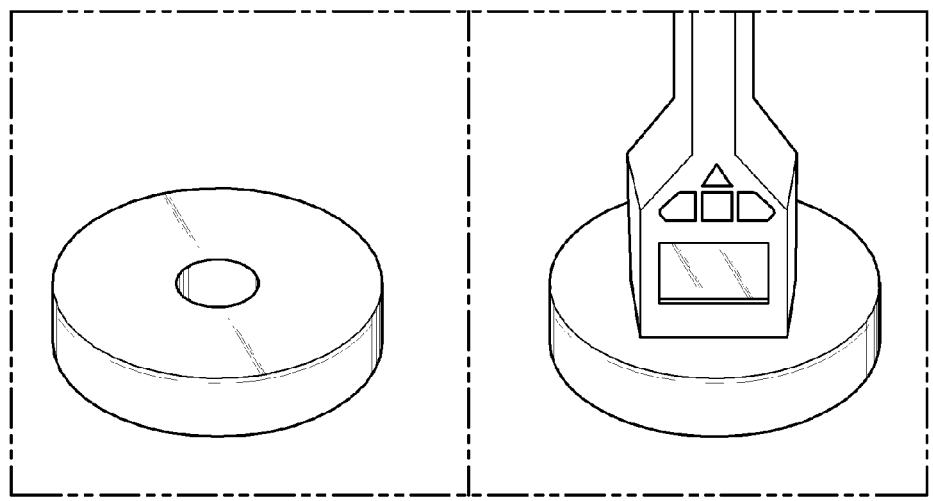
FIGS. 10 and 11 are photographs in which, upon measuring radioactivity using a NaI detector according to the present invention, an internal shielding body, an external shielding body, and the detector are installed.
Figure 11:
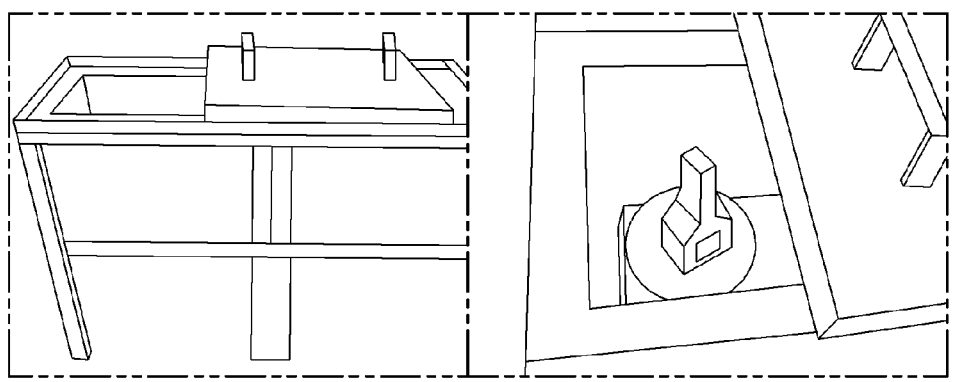

To maximally remove the background effects of background radiation in the present example, internal and external shielding bodies were manufactured in a double form as illustrated in FIGS. 10 and 11. The shielding bodies are made of lead, and the internal shielding body of FIG. 10 has a height of 6.5 cm, an inner diameter of 5.2 cm and an outer diameter of 20 cm, so as to cover the NaI probe of the detector.

The external shielding body (a shielding box) of FIG. 11 has a size of 420 mm×620 mm×410 mm, so that an ingot produced using melting decontamination is placed in the shielding body. To shield background radiation, 50 mm thick lead was provided on the top and wall of the shielding box, and a 25 mm thick stainless steel plate was applied to the bottom thereof in terms of self-shielding by the ingot and maintaining the shape of the shielding box. The shielding box weighed about 500 kg, of which the weight of the lead used for shielding was about 420 kg.

To calculate MDA depending on shielding effects and detection time, the detection value and MDA of the sample ingot were calculated depending on the measurement time. The ingot was demonstrated to be uniform via ICP-MS and had quantified activity, and thus could be used as a reference material upon analysis using the NaI detector.

The ingot was measured in and out of the shielding box, and the nuclide measured to analyze the concentration of uranium is U-235. Because the sample ingot is artificially contaminated with uranium powder having an enrichment of 4.65 w/o and then subjected to melting decontamination, the uranium enrichment in the ingot is estimated to be 4.65 w/o. However, metal generated in the subsequent heavy water reactor process may also be made into an ingot using melting decontamination, and thus the MDA was calculated on the assumption that the uranium enrichment in the additional ingot is 0.711 w/o. MDA was determined using the KTA-Rule for German regulatory compliance, which is comparatively simple and uses a fixed width based on a full width at half maximum (FWHM) in the peak region, in a fashion similar to the other MDA calculation.

The MDA calculation based on the KTA-Rule is represented by Equation 4 below.

$$MDA = \frac{(\sqrt{avgBKG \times FWHM}) \times \sigma(\text{confidence level})}{\text{Live Time} \times \text{efficiency} \times \gamma - \text{ratio}} \quad [\text{Equation 4}]$$

Ultimately, the radioactivity was not detected in all measurements, but the MDA exceeded the radioactivity reference (0.0187 Bq/g) of the ingot. To acquire the MDA of the corresponding level, measurement has to be performed for about thirty thousand seconds or more in the shielding box, which is regarded as being in actuality impossible. Although quantitative analysis of radioactivity using NaI in a very low amount of 0.01 Bq/g is considered difficult, the MDA value corresponding to 1/10 of 0.495 Bq/g which is the disposal limit for metal waste may be ensured upon measurement for about 3,600 sec in the shielding box. In the case of metal waste generated in the heavy water reactor process in which the detection of emitted gamma rays of U-235 is difficult due to comparatively low enrichment, the measurement time corresponding to about 1.5~2 times that of the metal waste (about 4.5 w/o) generated in the light water reactor process to ensure the same MDA value is required. However, the method of analyzing radioactivity of the ingot using gamma nuclide (U-235) analysis is carried out from a very conservative point-of-view, and thus the measurement time has to be appropriately determined depending on the situation.

TABLE 5

Measurement Results of Sample Ingot using NaI Detector
(U concentration = 0.0187 Bq/g)

| | | out of Shielding Box | | | in Shielding Box | | | |
|---|---|---|---|---|---|---|---|---|
| | Measure Time | Measure Value | MDA (Bq/g) | | Measure Value | MDA (Bq/g) | | |
| No. | (s) | (Bq/g) | 4.65 w/o | 0.711 w/o | (Bq/g) | 4.65 w/o | 0.711 w/o | Note |
| 1 | 1,000 | <MDA | 1.695E−01 | 3.324E−01 | <MDA | 6.641E−02 | 1.303E−01 | |
| 2 | 2,000 | | 1.166E−01 | 2.287E−01 | | 4.742E−02 | 9.299E−02 | |
| 3 | 3,600 | | 8.993E−02 | 1.764E−01 | | 3.530E−02 | 6.922E−02 | |
| 4 | 5,000 | | 7.397E−02 | 1.451E−01 | | 3.057E−02 | 5.950E−02 | |
| 5 | 7,200 | | 6.198E−02 (7,000 s) | 1.216E−01 (7,000 s) | | 2.499E−02 | 4.901E−02 | |

TABLE 6

Measurement of Surface Contamination
of Contaminated Ingot (identiFINDER)

| | Measured Value (CPS) - (180~190 keV range) | | |
|---|---|---|---|
| | Contaminated surface | Non-contaminated surface | Note |
| Contaminated Ingot | 2.922 | 0.674 | 23% |

As is apparent from Table 5, the MDA was calculated depending on the measurement time and the extent of shielding of background radiation. Because the radioactivity of the ingot used in the test is very low and the density of the medium is comparatively high, when gamma rays generated from the inside of the medium move up to the surface of the detector in consideration of attenuation by the medium, without effects due to statistical change, a question may be raised in terms of the performance of the detector able to detect such radiation. To evaluate whether the performance of detection for radiation emitted from U-235 is sufficient, an ingot which has only one contaminated surface was used. The ingot having the single contaminated surface was directly manufactured from a melt during the melting decontamination, and artificially manufactured in a state of containing a contaminant (slag). Thus the contaminant is expected to be mainly distributed at the upper end of the ingot due to the difference in density between the slag and the melt. As a result of measurement using a surface contamination meter, the contaminated surface exhibits comparatively high contamination, whereas the surface opposite the contaminated surface shows the background level.

The thickness of the ingot is 2 cm and is comparatively thinner than an ingot produced in melting decontamination facilities, but is sufficient for testing. The probability in which gamma rays of 185.72 key emitted from U-235 distributed on one surface of the ingot pass through the ingot having a thickness of 2 cm and reach the opposite surface is 8.68%, and the corresponding value was calculated using a theoretical equation:

$$I = I_0 \exp^{-\mu t}.$$

The count number on the non-contaminated surface is 23% of that on the contaminated surface, which is greater than the theoretical value of 8.7%. This is because uniform formation of the contaminated surface of the ingot is actually difficult and the area of interest relative to the contaminated surface of the ingot is enlarged, which is vertically spaced apart from the contaminated surface by 2 cm. The theoretical calculation is based on the assumption that only the surface of the ingot is contaminated, but upon actually manufacturing the contaminated ingot, the uranium contaminant may permeate to a predetermined depth from the surface of the ingot, undesirably deteriorating self-absorption effects by the medium.

However, in the case of the ingot having a thickness of about 2 cm, uranium gamma rays (U-235; 185.72 key) emitted from the contaminated surface are detected on the opposite surface, from which the radioactivity of the ingot may be sufficiently analyzed using the corresponding detector. The corresponding detector has a NaI crystal area (about 17.5 cm$^3$) much smaller than the effective measurement area (166 cm$^3$) of the surface contamination meter, and thus may measure only a portion of the surface of the ingot, but does not have a great influence on analysis because the ingot is typically uniform, and is therefore regarded as effective at analyzing the radioactivity of uranium in the ingot.

Figure 12:
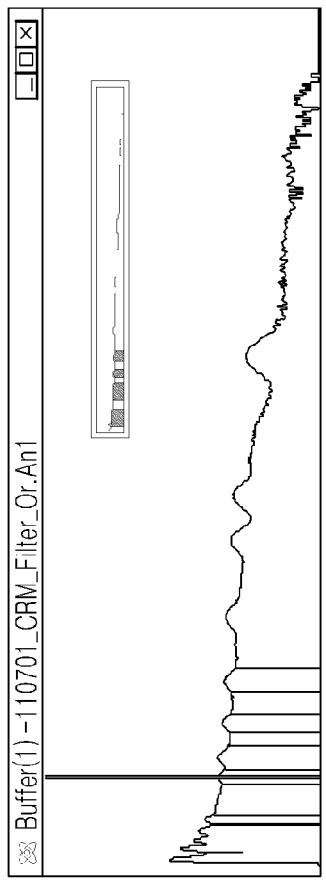
FIGS. 12A and 12B illustrate energy and efficiency calibrations of the NaI detector.
Figure 12:
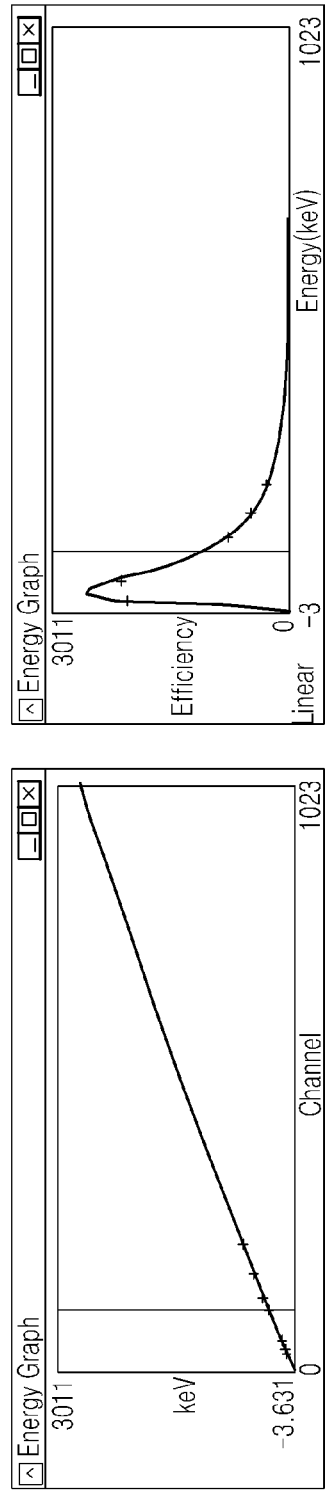

FIGS. 12A and 12B show energy and efficiency calibrations of the detector using the reference material, in which FIG. 12A shows the spectrum of the certificated reference material and FIG. 12B shows the energy calibration and the efficiency calibration at the left and the right, respectively.

Figure 13:
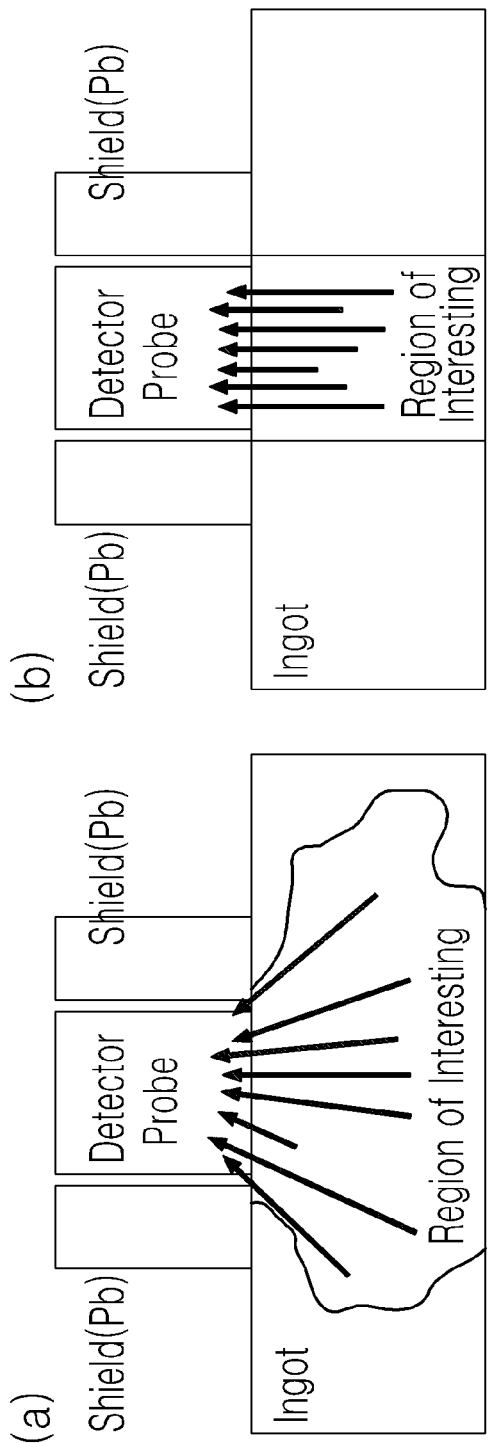
FIGS. 13A and 13B illustrate the actual radioactivity detection environment upon measuring radioactivity of ingots using a radiation detector and the detection environment upon calculating radioactivity in the present invention, respectively.

When radiation in the ingot is actually measured using a radioactivity detector, radiation reaching the detector is gamma rays generated by most of the ingot as shown in FIG. 13A.

However because the ingot is made of a metal medium having high density, it is difficult to accurately determine the moving distance from the generation position of gamma rays up to the effective area of the detector, making it very difficult to determine the amount (volume/mass) of the ingot which affects the detection.

In the present invention the detection region of the ingot is supposed to be FIG. 13B. In this case, as shown in FIG. 13A, because radiation coming from most of the ingot is supposed to be generated in the region corresponding to the detection area of the detector, the radiation generation density in the ingot relative to the region of interest is increased compared to the actual case. On the assumption that the radiation incident on the detector has the same flux in both of FIGS. 13A and 13B, the volume of the region of interest of the ingot of FIG. 13B is smaller compared to FIG. 13A, and thus detection environment like that of FIG. 13B is evaluated conservatively in terms of the analysis of radioactivity of the ingot. This assumption may be applied under conditions of the radioactivity of the ingot being uniform. The assumption in which the radioactivity of the ingot produced using melting decontamination is uniform is sufficiently reasonable within the scope of the present invention.

Melt and Ingot Uniformity

Regarding the melt and ingot uniformity in the present invention, uniformity of the ingot produced using melting decontamination has already been revealed by many prior studies. For example, according to M. Aoyama (2005), upon a melting decontamination test of stainless steel contaminated with depleted uranium, the upper, middle and lower portions of the melt were sampled and analyzed using ICP-MS, so that respective concentrations were reported to be similar, and similar results were also obtained even by the metal melting decontamination test performed at the Korea Atomic Energy Research Institute.

Furthermore in many industrial melting decontamination facilities, radioactivity analysis was performed on the assumption that all of the ingots produced using melting decontamination are uniform. Particularly in the case of Studsvik, only a small amount was sampled from an ingot having 3~5 tons and analyzed. The melting decontamination is advantageous because representativeness of the ingot on a large scale may be acquired via analysis of a small amount of sample.

However, there may exist local radioactivity concentrations depending on the operating conditions such as the type of melting furnace and the additives upon melting decontamination. Thus in the present example, the following melting decontamination tests were conducted two times, and the melt and the ingot/slag were analyzed using ICP-MS, thereby ascertaining the uniformity of the melt.

Two tests were carried out. The first test was performed by subjecting contaminated metal waste to melting decontamination, thus producing 10 ingots among which a single melt sample and two ingot samples were selected, and the upper, middle and lower portions at three different positions of each of the selected ingots, namely, 9 positions per ingot, were sampled and analyzed and compared using ICP-MS, and simultaneously the melt sample and slag were subjected to gamma nuclide analysis using HPGe, thereby conducting cross analysis. In particular in the case of slag, the slag was sampled in the early, middle and late stages of melting decontamination depending on the time at which slag was generated, and respectively analyzed.

The second test was carried out by artificially charging 1 kg of $UO_2$ having an enrichment of 4.65 w/o to non-contaminated metal to evaluate the material balance depending on the melting decontamination, and by sampling a single sample from the melt as in the first test to perform cross analysis using ICP-MS and gamma nuclide analysis, and also by sampling two of produced ingots at 9 positions per ingot to perform uranium concentration analysis using ICP-MS, thus proving uniformity in the melt. The generated slag was subjected to both gamma analysis and ICP-MS analysis, thus determining a decontamination coefficient and calculating the material balance.

In the melting decontamination process, 1 kg of $UO_2$ powder was charged into a melting furnace and nuclear fuel power having a comparatively high enrichment of 4.65 w/o was used. The melting decontamination in the melting furnace was carried out for about 3 hr. Because the ingot was separated from the mold in a state of the ingot being sufficiently cooled, this separating was performed the day after melting decontamination.

Figure 14:
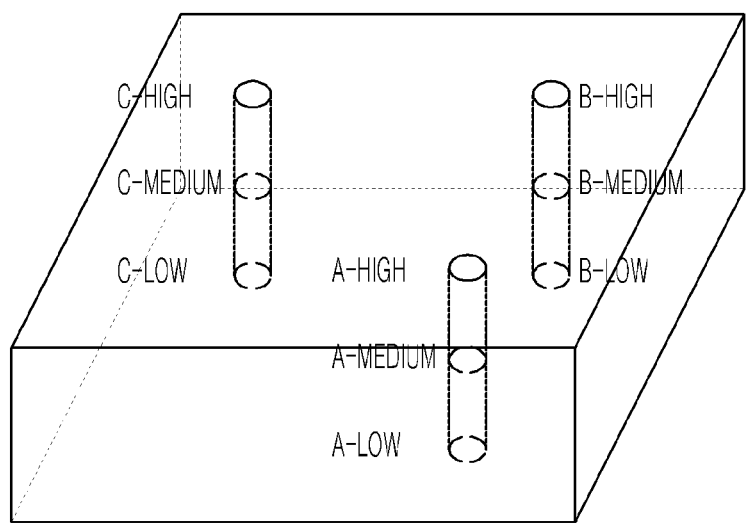
FIG. 14 illustrates the sampling positions inside the ingot subjected to melting decontamination in an example of the present invention.

Sampling was conducted in ingots and slag produced upon first and second tests, according to ASTM-1806. The samples and the measurement method are given in Tables 7 and 8 below, and FIG. 14 shows the sampling positions of the ingot.

TABLE 7

Sampling upon First Melting Decontamination Test

| Type | Sampling Method | Gamma Nuclide Analysis | ICP-MS Analysis | Note |
|---|---|---|---|---|
| #3 Ingot (25.6 kg) | Milling | 1,000 mL sampling | 1 EA sampling | |
| #6 Ingot (39.0 kg) | Drilling | | 3 × 3 EA sampling | |
| #7 Ingot (25.4 kg) | Drilling | | 3 × 3 EA sampling | |
| Slag (—) | — | | 3 EA sampling | |
| Total | | about 1000 mL | 22 EA | |

TABLE 8

Sampling upon Second Melting Decontamination Test

| Type | Sampling Method | Gamma Nuclide Analysis | ICP-MS Analysis | Note |
|---|---|---|---|---|
| #3 Ingot (23.6 kg) | milling | 1,000 mL sampling | 1 EA sampling | |
| #6 Ingot (36.6 kg) | drilling | | 3 × 3 EA sampling | |
| #7 Ingot (22.4 kg) | drilling | | 3 × 3 EA sampling | |
| Melt Sample (6.4 kg) | milling | 1,000 mL sampling | 1 EA sampling | Crucible |
| Slag (—) | — | | 3 EA sampling | |
| Total | | about 2000 mL | 23 EA | |

Analytic Results

The ingots and slag produced upon first and second melting decontamination tests were analyzed using ICP-MS and HPGe, thus obtaining the following results.

TABLE 9

Amount of Work and Generated Slag upon First Melting Decontamination Test

| | Charging Material (kg) | Additive (kg) | | | | | Amount of work (kg) | Slag (kg) |
| --- | --- | --- | --- | --- | --- | --- | --- | --- |
| | | C additive | Graphite electrode powder | Ferro-silicon | Deoxidant | SLAX | | |
| 1st (5/24) | Ingot reused 124.5 kg steel scrap, alloys, zinc platings | 1.4 | 0.7 | 3 | 0.3 | 3.5 | 259 | 14.3 |
| 2nd (5/25) | Ingot reused 0 kg, steel scrap, zinc platings | 2.4 | 1.8 | 3 | 0.25 | 5.1 | 250 | 22.9 |

TABLE 10

Analysis of Ingots and Slag using Melting Decontamination Tests

| | | ICP-MS (Bq/g) | HPGe (Bq/g) | Note |
| --- | --- | --- | --- | --- |
| 1st | #3 Ingot | 0.0047 | 0.0120 | |
| | #6 Ingot | 0.0047~0.0096 (Avg: 0.0071, STD: 0.00143) | — | |
| | #7 Ingot | 0.0049~0.0078 (Avg: 0.0059, STD: 0.000952) | — | |
| | Slag | 337/13.2/9.02 | 131/14.9/28.7 | Early/Middle/Late |
| 2nd Melt | | 0.0250 | 0.02045 | |
| | #3 Ingot | 0.0212 | 0.02813 | |
| | #6 Ingot | 0.0145~0.0209 (Avg: 0.0170, STD: 0.00206) | — | |
| | #7 Ingot | 0.0148~0.0276 (Avg: 0.0187, STD: 0.00372) | — | |
| | Slag | 4,941/86.4/491.8 | 2,903/286.8/932.2 | Early/Middle/Late |

In the first melting test, uranium was not artificially charged, and thus the radioactivity of ingots and slag was low, and also because contaminated metal waste which is difficult to measure was subjected to melting decontamination, the initial contamination concentration could not be determined.

In the second melting test, the initial contamination concentration was $7.3 \times 10^7$ Bq.

The radioactivity in the ingots using ICP-MS was measured to be 0.0047~0.0096 Bq/g in the first test and 0.0145~0.0250 Bq/g in the second test. Although there seems to be a relatively small standard deviation, the corresponding level is vey low to the extent of less than 1/10 of the natural level (0.0250 Bq/g is about 0.3 ppm, and the uranium concentration in the natural soil is about 3~5 ppm). Taking into consideration the statistical measurement error occurring therefrom, the above results are evaluated as being good enough to prove uniformity in the melt upon melting decontamination.

The ingot having the highest measurement value is less than 2% of the clearance limit of 0.497 Bq/g, from which the decontamination level is evaluated to be excellent using melting.

Tables 11 to 16 below show the measurement results per ingot sample.

TABLE 11

Analytic Results of #3 Ingot upon First Melting Decontamination Test (ICP-MS/HPGe)

| | Analytic Method | Activity (Bq/g) | | | Note |
| --- | --- | --- | --- | --- | --- |
| | | U-235 | U-238 | Total | |
| #3 Ingot | ICP-MS | 0.0002 | 0.0010 | $4.70 \times 10^{-3}$ | |
| | HPGe | $4.95 \times 10^{-4}$ | — | $1.20 \times 10^{-2}$ | |

TABLE 12

Analytic Results of #6 Ingot upon First Melting Decontamination Test (ICP-MS)

| No. | Position | Activity (Bq/g) | | | Note |
| --- | --- | --- | --- | --- | --- |
| | | U-235 | U-238 | Total | |
| 1 | A-Upper | 0.0003 | 0.0019 | 0.0073 | |
| 2 | A-Middle | 0.0003 | 0.0018 | 0.0068 | |
| 3 | A-Lower | 0.0002 | 0.0015 | 0.0062 | |
| 4 | B-Upper | 0.0002 | 0.0015 | 0.0079 | |
| 5 | B-Middle | 0.0004 | 0.0022 | 0.0096 | |
| 6 | B-Lower | 0.0003 | 0.0019 | 0.0079 | |
| 7 | C-Upper | 0.0002 | 0.0012 | 0.0047 | |
| 8 | C-Middle | 0.0003 | 0.0018 | 0.0077 | |
| 9 | C-Lower | 0.0002 | 0.0014 | 0.0058 | |
| | Average | — | — | 0.0071 | |
| | Standard Deviation | — | — | 0.00143 | |

TABLE 13

Analytic Results of #7 Ingot upon First Melting Decontamination Test (ICP-MS)

| No. | Position | Activity (Bq/g) | | | Note |
| --- | --- | --- | --- | --- | --- |
| | | U-235 | U-238 | Total | |
| 1 | A-Upper | 0.0002 | 0.0013 | 0.0054 | |
| 2 | A-Middle | 0.0002 | 0.0015 | 0.0061 | |
| 3 | A-Lower | 0.0003 | 0.0019 | 0.0069 | |
| 4 | B-Upper | 0.0002 | 0.0012 | 0.0049 | |
| 5 | B-Middle | 0.0002 | 0.0017 | 0.0056 | |
| 6 | B-Lower | 0.0002 | 0.0013 | 0.0050 | |
| 7 | C-Upper | 0.0002 | 0.0014 | 0.0062 | |
| 8 | C-Middle | 0.0003 | 0.0026 | 0.0078 | |
| 9 | C-Lower | 0.0002 | 0.0013 | 0.0053 | |
| | Average | — | — | 0.005911 | |
| | Standard Deviation | — | — | 0.000952 | |

TABLE 14

Analytic Results of Melt and #3 Ingot upon Second Melting Decontamination Test (ICP-MS/HPGe)

| | | Activity (Bq/g) | | | |
|---|---|---|---|---|---|
| Analytic Method | | U-235 | U-238 | Total | Note |
| #3 Ingot | ICP-MS | 0.0007 | 0.0031 | $2.12 \times 10^{-2}$ | |
| | HPGe | $1.26 \times 10^{-3}$ | — | $2.813 \times 10^{-2}$ | 4.65 w/o |
| Melt Sample | ICP-MS | 0.0011 | 0.0036 | $2.50 \times 10^{-2}$ | |
| | HPGe | $9.18 \times 10^{-4}$ | — | $2.045 \times 10^{-2}$ | 4.65 w/o |

TABLE 15

Analytic Results of #6 Ingot upon Second Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0008 | 0.0025 | 0.0175 | |
| 2 | A-Middle | 0.0008 | 0.0026 | 0.0185 | |
| 3 | A-Lower | 0.0009 | 0.0026 | 0.0185 | |
| 4 | B-Upper | 0.0008 | 0.0022 | 0.0153 | |
| 5 | B-Middle | 0.0008 | 0.0023 | 0.0162 | |
| 6 | B-Lower | 0.0008 | 0.0024 | 0.0167 | |
| 7 | C-Upper | 0.0008 | 0.0030 | 0.0209 | |
| 8 | C-Middle | 0.0007 | 0.0021 | 0.0145 | |
| 9 | C-Lower | 0.0008 | 0.0021 | 0.0150 | |
| Average | | — | — | 0.017011 | |
| Standard Deviation | | — | — | 0.002056 | |

TABLE 16

Analytic Results of #7 Ingot upon Second Melting Decontamination Test (ICP-MS)

| | | Activity (Bq/g) | | | |
|---|---|---|---|---|---|
| No. | Position | U-235 | U-238 | Total | Note |
| 1 | A-Upper | 0.0010 | 0.0026 | 0.0183 | |
| 2 | A-Middle | 0.0009 | 0.0024 | 0.0170 | |
| 3 | A-Lower | 0.0010 | 0.0024 | 0.0171 | |
| 4 | B-Upper | 0.0007 | 0.0027 | 0.0187 | |
| 5 | B-Middle | 0.0007 | 0.0030 | 0.0209 | |
| 6 | B-Lower | 0.0008 | 0.0040 | 0.0276 | |
| 7 | C-Upper | 0.0006 | 0.0025 | 0.0176 | |
| 8 | C-Middle | 0.0005 | 0.0021 | 0.0148 | |
| 9 | C-Lower | 0.0007 | 0.0027 | 0.0166 | |

TABLE 16-continued

Analytic Results of #7 Ingot upon Second Melting Decontamination Test (ICP-MS)

| | | Activity (Bq/g) | | | |
|---|---|---|---|---|---|
| No. | Position | U-235 | U-238 | Total | Note |
| Average | | — | — | 0.018733 | |
| Standard Deviation | | — | — | 0.003716 | |

Analytic Results of Ingots (Portable NaI Detector)

Although the above HPGe and ICP-MS analysis methods have very high precision and accuracy, analysis costs are high and a very long time and a lot of effort are required to pretreat the measurement sample, and also the measurement time is not short, making it difficult to instantly feedback the analytic results to the location where the decontamination is being carried out.

In order to increase decontamination work efficiency and instantly determine the analyzed ingot radioactivity, a surface contamination meter such as FHT-100 able to measure the radioactivity on site may be used, but the measurement of the radioactivity of ingots having volume contamination characteristics using the above meter is difficult.

Thus to analyze the radioactivity of the ingots subjected to decontamination in the present invention, a NaI spectrometer having gamma measurement efficiency higher than the surface contamination meter is used. Also to acquire reliable measurement, ingots analyzed using NaI are milled thus manufacturing a Marinelli beaker type sample which is then analyzed using HPGe, thus performing cross analysis.

The samples used in cross analysis are about 20 ingots including No. 0114-3 ingot, and the corresponding ingots are obtained by subjecting metal waste generated during the light water reactor fuel processing to melting decontamination, in which some of them were manufactured for clearance (Table 17), and others having high radioactivity were intentionally manufactured to perform a series of tests about the radioactivity analysis (Table 18). The uranium enrichment in the corresponding ingots was 4.0 w/o. When metal waste is generated in radiation controlled zones, it is thoroughly sorted depending on the affected areas, methods of production, contamination characteristics, etc. The metal waste sorted as above is stored in respective drums depending on contamination characteristics, physical properties, etc., and thus a history survey of respective ingots produced using melting decontamination is possible, from which desired results were deduced.

The results of analyzing the radioactivity in ingots using HPGe and NaI are shown in Tables 17 and 18 below.

TABLE 17

Gamma Nuclide Analysis - Cross Analysis (HPGe & NaI) - Clearance Targets

| | | | HPGe (10000 s) | | NaI (3600 s) | | | |
|---|---|---|---|---|---|---|---|---|
| No. | Sample No. | Sample Amount (g) | Measure Result (Bq/g) | MDA (Bq/g) | Measure Result (Bq/g) | MDA (Bq/g) | Deviation (%)* | Note |
| 1 | 0114-3 | 279.7 | 2.195E−02 | 9.162E−03 | ≤MDA | 3.822E−02 | 43% | |
| 2 | 0217-3 | 396.9 | 2.531E−02 | 6.395E−03 | ≤MDA | 3.950E−02 | 36% | |
| 3 | 0218-3 | 487.3 | 3.680E−02 | 7.665E−03 | ≤MDA | 3.574E−02 | −3% | |
| 4 | 0224-3 | 378.2 | 6.469E−02 | 1.505E−02 | ≤MDA | 3.487E−02 | −86% | |
| 5 | 0225-3 | 525.2 | 4.564E−02 | 5.004E−03 | ≤MDA | 3.714E−02 | −23% | |
| 6 | 0318-3 | 347.2 | ≤MDA | 1.013E−02 | ≤MDA | 3.576E−02 | 72% | |
| 7 | 0323-3 | 482.3 | 5.206E−02 | 1.041E−02 | ≤MDA | 3.572E−02 | −46% | |
| 8 | 0325-3 | 505.4 | 2.618E−02 | 7.032E−03 | ≤MDA | 3.569E−02 | 27% | |
| 9 | 0406-3 | 441.8 | 6.800E−02 | 5.940E−03 | ≤MDA | 3.611E−02 | −88% | |
| 10 | 0421-3 | 357.7 | 3.620E−02 | 7.788E−03 | ≤MDA | 3.512E−02 | −3% | |
| 11 | 0506-3 | 401.7 | 2.278E−02 | 6.814E−03 | ≤MDA | 3.661E−02 | 38% | |

TABLE 17-continued

Gamma Nuclide Analysis - Cross Analysis (HPGe & NaI) - Clearance Targets

| | | | HPGe (10000 s) | | NaI (3600 s) | | | |
|---|---|---|---|---|---|---|---|---|
| No. | Sample No. | Sample Amount (g) | Measure Result (Bq/g) | MDA (Bq/g) | Measure Result (Bq/g) | MDA (Bq/g) | Deviation (%)* | Note |
| 12 | 0524-3 | 651.7 | 2.041E−02 | 4.459E−03 | ≤MDA | 3.390E−02 | 40% | |
| 13 | 0525-3 | 395.8 | 5.844E−02 | 6.368E−03 | ≤MDA | 3.628E−02 | −61% | |
| 14 | 0623-3 | 465.0 | 5.572E−02 | 1.002E−02 | ≤MDA | 3.566E−02 | −56% | |
| 15 | 0701-3 | 500.2 | 5.334E−02 | 5.500E−03 | ≤MDA | 3.602E−02 | −48% | |
| 16 | 0705-3 | 512.0 | 5.853E−02 | 5.512E−03 | ≤MDA | 3.589E−02 | −63% | |
| 17 | 0712-3 | 656.5 | 3.906E−02 | 4.621E−03 | 9.006E−02 | 3.561E−02 | 57% | |
| 18 | 0718-3 | 360.6 | 3.402E−02 | 7.504E−03 | ≤MDA | 3.595E−02 | 5% | |

*Deviation = (NaI measurement result-HPGe measurement result)/(NaI measurement result) × 100%

TABLE 18

Gamma Nuclide Analysis - Cross Analysis (HPGe & NaI) - High Concentration Level

| | | | HPGe (10000 s) | | NaI (3600 s) | | | |
|---|---|---|---|---|---|---|---|---|
| No. | Sample No. | Sample Amount (g) | Measure Result (Bq/g) | MDA (Bq/g) | Measure Result (Bq/g) | MDA (Bq/g) | Deviation (%)* | Note |
| 1 | 0621-3 | 581.8 | 1.863E−01 | 6.555E−03 | 1.812E−01 | 3.716E−02 | −3% | |
| 2 | 0615-3 | 456.9 | 4.557E−01 | 6.830E−03 | 5.104E−01 | 3.778E−02 | 11% | |
| 3 | 0714-3 | 454.3 | 5.880E−01 | 8.254E−03 | 7.020E−01 | 3.914E−02 | 16% | |
| 4 | 0707-5 | 606.9 | 5.367E−01 | 7.475E−03 | 7.189E−01 | 3.926E−02 | 25% | |

*Deviation = (NaI measurement result-HPGe measurement result)/(NaI measurement result) × 100%

Upon analysis using NaI, MDA was measured to be about $3.5 \times 10^{-2}$ Bq/g for 3,600 sec, which is about 2~10 times higher than the MDA by HPGe (measurement for 10,000 sec). However, because this value is less than 1/10 of 0.497 Bq/g which is the clearance limit for metal waste, this is regarded as sufficient for determining whether the ingot may be self-disposed of. Also because the sample having similar radioactivity shows a comparatively uniform MDA, the reliability of the detector to operate normally is ensured.

The analytic results using NaI are mostly equal to or lower than MDA, which means that all the ingots produced using melting decontamination may be self-disposed of. When the results measured using NaI are conservatively defined as MDA and compared with the measurement results using HPGe, there may be the case where NaI is underestimated to a maximum of 88% compared to HPGe (Sample No.: 0406-3), which is considered to be due to the uncertainty due to very low radioactivity. The actual difference is about $5.76 \times 10^{-2}$ Bq/g, and is the level that ensures a sufficient margin, in consideration of the concentration of the clearance limit.

Generating the measurement deviation is understood to be limited only at a very low radioactivity level. To validate this, the ingots having slightly high radioactivity generated during the additive charging test at the early stage of melting decontamination (Table 18) were subjected to radioactivity measurement using NaI. Because the amount of the additives of the corresponding ingots was adjusted to produce ingots having relatively high radioactivity in order to perform cross analysis of HPGe and NaI for metal having high radioactivity level, the radioactivity approximates or partially exceeds the clearance limit.

As a result of measuring the radioactivity of the corresponding ingots, the analytic results of NaI and HPGe were similar at the concentration of about $1.8 \times 10^{-1}$ Bq/g. However, as the radioactivity increases, analytic results using NaI are shown to be comparatively higher.

This may be understood to be a conservative approach to the uncertainty of portions which are difficult to actually quantify and to apply to analysis methods, such as the geometry of target ingots, etc., and such effects increase in proportion to an increase in the radioactivity. To identify the quantitative analysis of radioactivity measured using NaI and the mechanism thereof, additional research is required, but to determine whether the ingots subjected to melting decontamination may be self-disposed of or not, only the NaI method is sufficiently effective.

Although all the ingots analyzed via NaI were subjected to cross analysis using a gamma spectrometer (HPGe) in order to improve the reliability of the analysis, the HPGe suffers from the additional formation of the samples therefor, long measurement time, and high analysis cost, and thus the cross analysis range may be adjusted to adapt it to an actual location within the range in which the reliability of NaI is sufficiently ensured.

The crystal size of the NaI detector is 1.4×2 inch$^2$ and the detection area is a portion of the entire ingot area thus causing problems of representativeness. In many foreign and domestic studies, however, the ingots manufactured using the same melt are reported to have uniform radioactivity, which was validated at Korea Nuclear Fuel Co., Ltd. Because uranium nuclides are uniformly distributed in the ingots as mentioned above, even when the local radioactivity of the ingots is measured, the corresponding concentration is regarded as representing the radioactivity of the total ingot, in particular the total melt. Thus, the radioactivity analyzed using NaI may represent the radioactivity of the total ingot, and is effective at determining whether the corresponding ingot is subjected to clearance.

As described above, the present invention provides a method of disposing of radioactive metal waste using melting decontamination. According to the present invention, metal waste generated in nuclear fuel processing or production facilities is sorted by predetermined sorting criteria, followed by performing melting decontamination, subjecting the resulting ingots to gamma spectroscopy to measure radioactivity of only U-235 among uranium isotopes, calculating the total radioactivity of the ingots, and rapidly and efficiently determining whether clearance of the ingots obtained by subjecting the metal waste to melting decontamination is possible.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of disposing of radioactive metal waste using melting decontamination, comprising:
   1) sorting radioactive metal waste generated in nuclear fuel processing or production facilities by predetermined sorting criteria and charging the sorted metal waste into a melting furnace so that the metal waste is melted;
   2) adding a impurity remover to a melt of the melting furnace and removing generated slag;
   3) pouring the melt having no slag into at least one mold thus producing an ingot;
   4) subjecting the ingot to gamma spectroscopy using a gamma spectrometer to measure gamma rays of U-235 (185.72 key, 57.2%) among uranium isotopes, performing detector calibration using a certified reference material (CRM) and self-absorption correction depending on a density of a medium using a MCNP (Monte Carlo N-Particle) computer code, and calculating total radioactivity of the ingot from quantified radioactivity and mass of U-235; and
   5) determining whether the ingot subjected to radioactivity measurement satisfies a clearance limit.

2. The method of claim 1, wherein in 1), pretreatment to decontaminate a surface of the metal waste is additionally carried out before charging the metal waste into the melting furnace.

3. The method of claim 1, wherein in 3), a deoxidant is additionally added to the melt before pouring the melt into the mold.

4. The method of claim 1, wherein the melting furnace is a high frequency induction heating furnace.

5. The method of claim 1, wherein the melting furnace comprises:
   a ladle for pouring the melt of the melting furnace to transfer the melt;
   a trolley positioned adjacent to the ladle so as to be transportable; and
   a plurality of molds positioned above the trolley to produce an ingot from the melt poured from the ladle.

6. The method of claim 4, wherein the melting furnace comprises:
   a ladle for pouring the melt of the melting furnace to transfer the melt;
   a trolley positioned adjacent to the ladle so as to be transportable; and
   a plurality of molds positioned above the trolley to produce an ingot from the melt poured from the ladle.

7. The method of claim 1, wherein the U-235 has an enrichment of 0.711 w/o~5 w/o.

8. The method of claim 1, wherein in 4), the radioactivity and mass of U-235 are quantified using a detection value of gamma rays of U-235, a total uranium weight is calculated depending on the enrichment of U-235, and radioactivity of total uranium is obtained from the following equation:

$$S.A(Ci/g) = (0.4 + 0.38 E_{235} + 0.0034 E_{235}^2) \times 10^{-6} \quad \text{[Equation]}$$

wherein S.A is a specific activity of total uranium using the enrichment ($E_{235}$) of U-235.

9. The method of claim 8, wherein the enrichment of U-235 is determined depending on a source of the generated metal waste.

10. The method of claim 1, wherein the gamma spectrometer is a NaI detector, and a measurement time of the ingot using the NaI detector is 3,600~7,200 sec.

* * * * *